June 30, 1925.  1,544,231
W. H. HOBBS
UTENSIL FOR HANDLING PIE TINS
Filed March 18, 1925
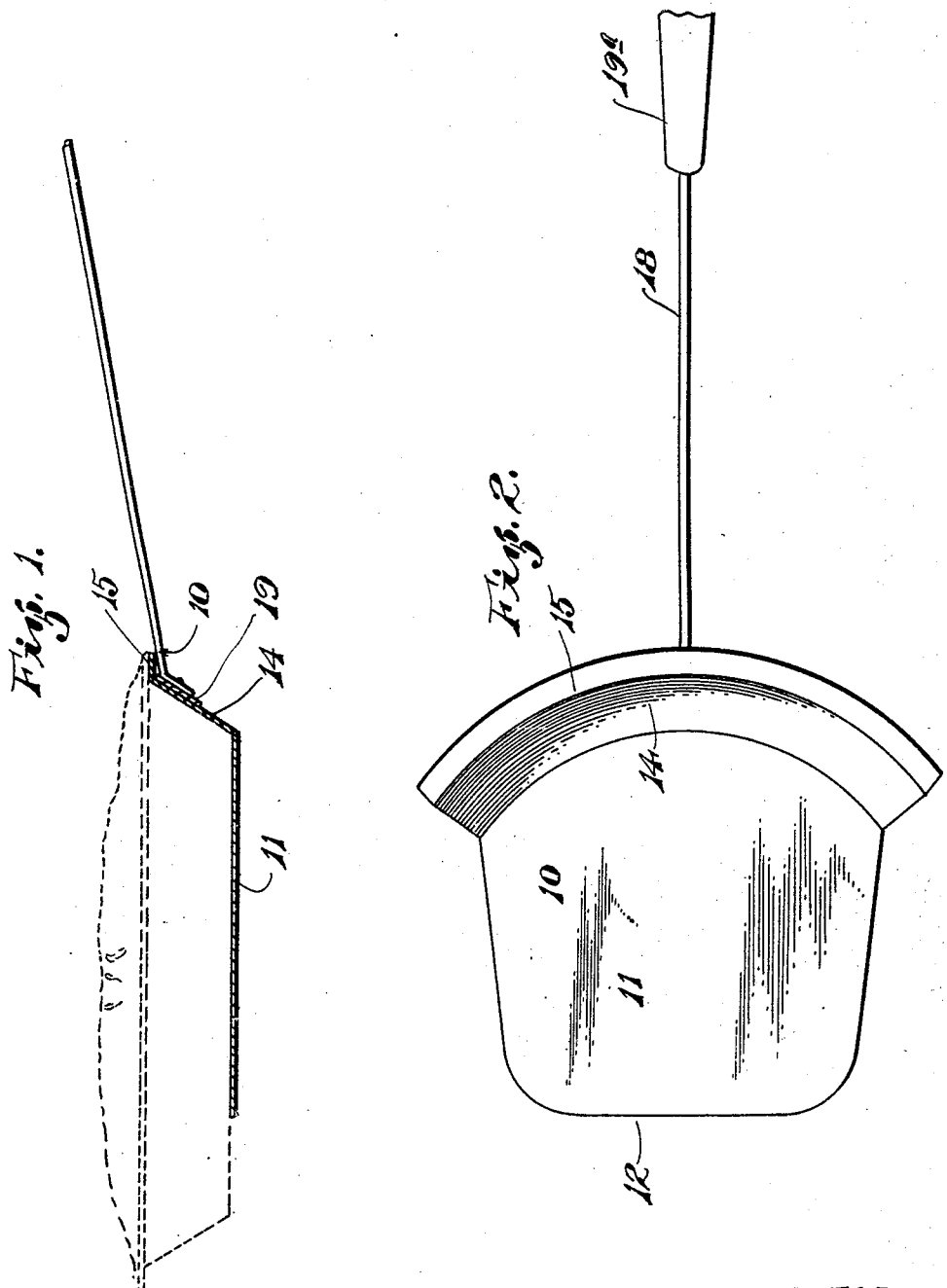
INVENTOR
WILLIAM H. HOBBS
BY Dewey, Strong, Townsend + Loftus
ATTYS.

Patented June 30, 1925.

1,544,231

UNITED STATES PATENT OFFICE.

WILLIAM H. HOBBS, OF PIEDMONT, CALIFORNIA.

UTENSIL FOR HANDLING PIE TINS.

Application filed March 18, 1925. Serial No. 16,348.

*To all whom it may concern:*

Be it known that I, WILLIAM H. HOBBS, a citizen of the United States, residing at Piedmont, county of Alameda, and State of California, have invented new and useful Improvements in Utensils for Handling Pie Tins, of which the following is a specification.

This invention relates to kitchen utensils and particularly pertains to devices for removing hot pie or cake tins from an oven.

It is the principal object of the present invention to provide a generally improved utensil of the character described which is adapted to receive and firmly support a pie tin so that the utensil may be used expeditiously in removing hot pie tins from an oven, which utensil is of simple and inexpensive construction.

One form which the invention may assume is exemplified in the following description and illustrated by way of example in the accompanying drawings, in which:

Fig. 1 is a view in side elevation disclosing the blade in section and supporting a pie tin.

Fig. 2 is a plan view of the utensil.

Referring more particularly to the accompanying drawings, 10 indicates a utensil embodying my invention. This utensil is formed with a flat blade 11 having a somewhat rounded end 12. At the other end of the blade a curved segmental rim 14 is formed. This rim 14 extends in an arc of approximately 90 degrees and projects vertically from the rear marginal edge of the blade at the same angle as the marginal rim of standard pie tins. The curvature of the rim coincides with that of standard pie tins.

The upper edge of the arcuate and beveled rim 14 is bent outwardly to form a lip 15 parallel to the plane of the blade. As is shown in Fig. 1, the standard pie tins have lips similar to that formed on the rim 14. The height of the rim 14 is approximately the same as that of a pie tin so that the latter will nest over the rim 14 and the lip 15 with the surrounding lip on the tin bearing on the lip 15. This assists in preventing the pie tins from becoming dislodged from the utensil.

The lip 15 also materially stiffens the entire blade so that it will not warp or bend out of shape when a weighted pie tin is lifted thereby. In actual practice it has been found that by the construction just described the utensil may be made of very inexpensive thin sheet metal which is easily stamped out in one operation, thereby reducing manufacturing costs to a minimum.

So that the blade may be manipulated, an elongated handle 18 is provided. This handle is fitted at one end with a plate 19 which is secured to the rear surface of the rim 14 below the lip 15. The handle 18 extends at a slight angle to the blade and is fitted at its other end with a grip 19$^a$.

The actual use to which my utensil is put is that of removing hot cake or pie tins from an oven. The thin blade is inserted by means of the handle between the oven floor and the pie tin until the rim and lip of the pie tin nest over the segmental rim and lip of the utensil. The utensil is then removed from the oven bearing the pie tin. The construction of the utensil blade, that is, the inclined rim and lip which conform to the rim and lip of a pie tin, is such that the pie tin is snugly held on the blade and will not easily become dislodged from the blade.

The device here disclosed is inexpensive to manufacture and is a very desirable kitchen utensil.

While I have shown the preferred form of my invention, it is to be understood that various changes in its construction may be made by those skilled in the art without departing from the spirit of the invention as defined in the appended claims.

Having thus described my invention, what I claim and desire to secure by Letters Patent is:

1. As an article of manufacture, a utensil for removing pie tins from an oven which comprises a flat blade, a segmental arcuate rim at one end of the blade, said rim coinciding in height, curvature and bevel to the rim of a pie tin, a flat lip extending outwardly from said rim and parallel to the blade whereby the rim and marginal lip of a pie tin will nest over said rim and lip, and a handle extending outwardly from the rear surface of said rim.

2. As an article of manufacture, a utensil for removing pie tins from an oven which comprises a flat blade of considerable area, a segmental arcuate rim integrally formed with the blade and located at one end of the blade and extending through an arc of 90 degrees, said rim coinciding in height, curvature and bevel to the rim of a pie tin, the upper edge of the rim being bent outwardly to form a flat lip parallel to the blade, whereby the rim and lip of a pie tin will nest over said rim and lip of the blade when positioned on the blade, and a handle secured at one end to the rear surface of the rim and extending outwardly therefrom.

WILLIAM H. HOBBS.